(12) United States Patent
Borg et al.

(10) Patent No.: US 7,789,180 B2
(45) Date of Patent: Sep. 7, 2010

(54) INFLATABLE ARTICLE

(75) Inventors: Axel Borg, Laxå (SE); Phillip Maddock, Coleford (GB)

(73) Assignee: Airquee Limited, Bristol (GB)

( * ) Notice: Subject to any disclaimer, the term of this patent is extended or adjusted under 35 U.S.C. 154(b) by 346 days.

(21) Appl. No.: 11/962,377

(22) Filed: Dec. 21, 2007

(65) Prior Publication Data

US 2008/0153382 A1 Jun. 26, 2008

(30) Foreign Application Priority Data

Dec. 22, 2006 (GB) ................................. 0625828.9

(51) Int. Cl.
*B62D 23/00* (2006.01)
(52) U.S. Cl. .................................................... 180/89.1
(58) Field of Classification Search ................ 180/89.1; 446/220–226, 431, 457, 465, 470; 152/416
See application file for complete search history.

(56) References Cited

U.S. PATENT DOCUMENTS 3,215,113 A * 11/1965 Roberts ....................... 440/12.5

| 5,131,880 | A | 7/1992 | Nesbit et al. |
| 5,512,002 | A | 4/1996 | Lieberman |
| 6,474,373 | B1 * | 11/2002 | Sejnowski .................. 141/102 |
| 6,659,837 | B1 | 12/2003 | Lieberman |
| 2005/0287920 | A1 | 12/2005 | Lucas et al. |
| 2006/0230655 | A1 | 10/2006 | Machala |
| 2007/0044881 | A1 | 3/2007 | Skoff |

FOREIGN PATENT DOCUMENTS

| AU | 2001/100029 | 8/2001 |
| DE | 297 19 770 | 12/1997 |
| GB | 1 232 985 | 5/1971 |
| GB | 2 266 847 | 11/1993 |
| RU | 2 271 957 | 3/2006 |

* cited by examiner

*Primary Examiner*—Paul N Dickson
*Assistant Examiner*—Robert A Coker
(74) *Attorney, Agent, or Firm*—Stites & Harbison PLLC; Douglas E. Jackson

(57) ABSTRACT

An inflatable article having a single inflatable enclosure comprising a body portion and one or more rotary portions that can rotate relative to the body portion. The article may be a vehicle, wherein the rotary portions are wheel portions which support and are drivably rotatable relative to the body portion. The wheel portions may be connected to the body portion by hollow tubular axles which have outlets inside the wheel and body portions to provide fluid communication therebetween.

8 Claims, 11 Drawing Sheets

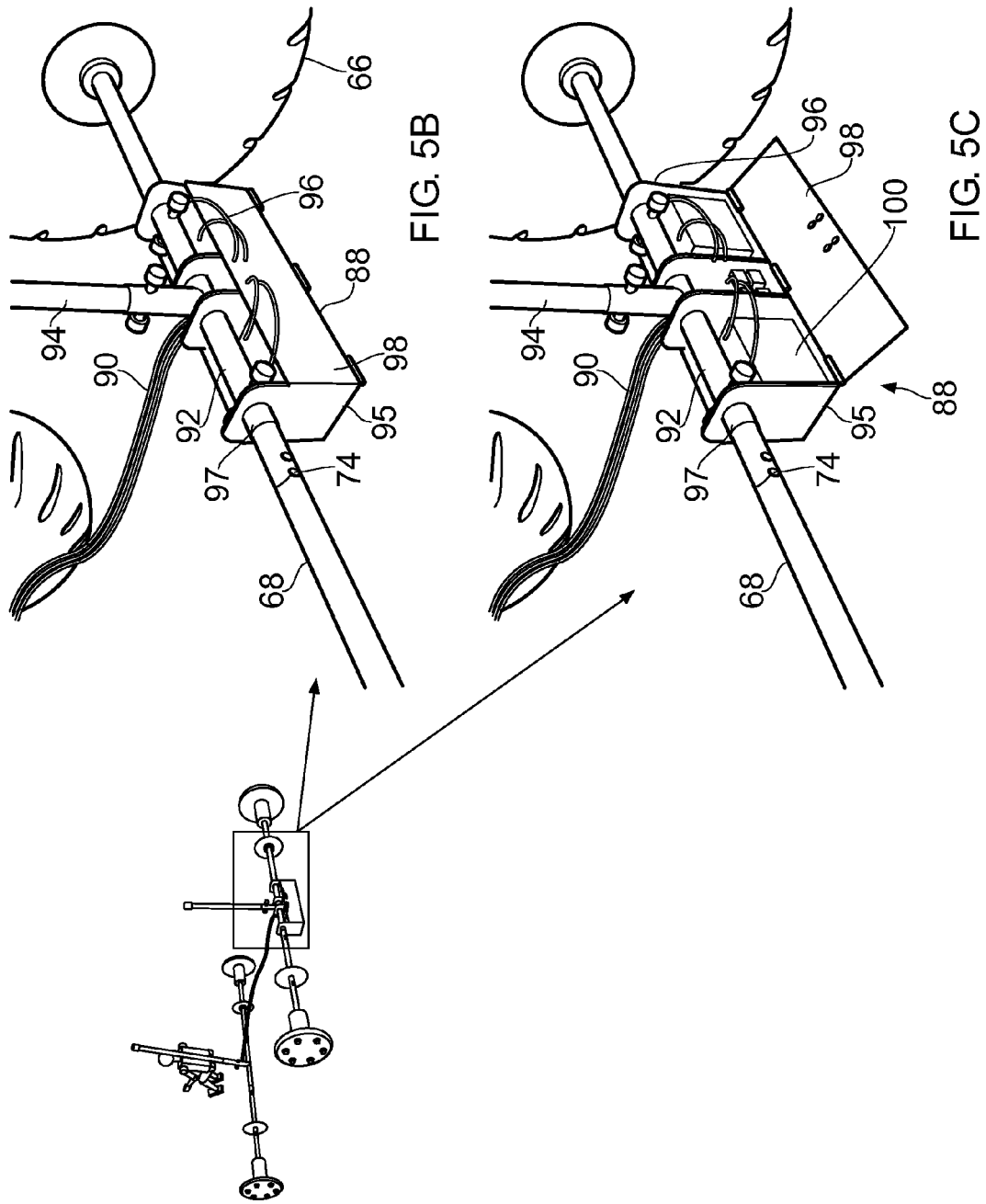

INFLATABLE ARTICLE

FIELD OF THE INVENTION

The present invention lies in the technical field of large scale inflatable products, e.g. low density, balloon-like articles. The invention also relates in part to vehicles. For example, it may be applied in the field of remotely, e.g. radio, controlled vehicles.

BACKGROUND TO THE INVENTION

The use of large scale inflatable displays as a means for promotional advertising is well known. Such displays are highly visible, yet are not difficult or cumbersome to transport when they are in deflated state. However, moving the display when inflated is more problematic, e.g. due to unwieldy size or because corresponding movement of an inflation device (e.g. compressor pump) would also be required.

U.S. Pat. No. 6,659,837 proposes one solution to this problem. It discloses an inflatable car with a lower cavity designed to fit snugly over a radio-controlled drive unit. This allows the inflatable car section, when inflated, to be transported at will. However, the introduction of the drive unit detracts from the inflatable nature of the device as a whole. However, the problem of moving inflations sources e.g. to allow continuous inflation of the inflatable portion is not addressed. This limits the size of inflatable that can be used.

SUMMARY OF THE INVENTION

One aim of the present invention is to provide a mobile inflatable device that is movable without an external (independent) drive unit, i.e. where the inflatable device itself is arranged to provide a driving force for movement.

In an associated idea, the present inventors have realised that a further drawback of conventional inflatable articles is their relatively static component parts. Another aim of the present invention is therefore to provide an inflatable article that includes inflatable components that can move, e.g. rotate, freely relative to one another when the article is inflated.

At its most general, the present invention therefore provides an inflatable article whose inflatable enclosure comprises portions that are independently movable relative to one another. The independently movable portions may be driven to propel the article, thereby providing an independently drivable inflatable vehicle. By providing a self-contained mobile inflatable vehicle in this way, any limitations on the size of vehicle due to the necessary drive unit of the prior art are removed. The vehicle of the present invention can therefore have a large size, e.g. suitable for large scale promotional displays and/or to carry humans.

According to a first aspect of the present invention, there may therefore be provided an inflatable article comprising a single inflatable enclosure that includes a body portion connected to a rotary portion, wherein the rotary portion is freely rotatable relative to the body portion when the enclosure is inflated. By single inflatable enclosure, the present application refers to a volume that can be inflated from a single source, e.g. compressed air supply or pump. The article may therefore remain inflatable, i.e. with an unbroken fluid communication path between the body portion and rotary portion, during rotation of the rotary portion. Preferably, rotation of the rotary portion does not cause any leakage of the inflation medium (e.g. air) from the inflatable enclosure.

Preferably, the rotary portion is rotatable about an axle connected to the body portion. Preferably, the axle is a hollow tube (of any suitable cross-section) having a first outlet in the body portion and a second outlet in the rotary portion to provide fluid communication therebetween. The outlets may be radial, i.e. penetrate the tubular wall. In other words, the axle is preferably a joining element that causes the body portion and rotary portion to form a single inflatable enclosure. Joining elements independent of the axle are also possible. When a inflation medium e.g. gas (preferably air) is pumped into the body portion or the rotary portion (from an external or internal source), it is communicated, preferably by the tubular axle elements, to all other parts of the enclosure. Further options and preferences are defined below with reference to a second aspect of the invention.

In the second aspect of the invention, the rotary portion of the first aspect is arranged to be drivable. There may therefore be provided an inflatable vehicle having a body portion connected to one or more wheel portions to form a single inflatable enclosure, the body portion being supported by the wheel portions when the enclosure is inflated, wherein one or more of the wheel portions are drivably rotatable with respect to the body portion. Thus, in an inflated configuration, the wheel portions may resemble wheels (e.g. tyres) which rest of the ground and support the body portion over the ground. The body portion may have a variety of forms. For example, it may be a elongate member with a part of a wheel portions at both sides of either end. Supports for the body portion need not all be drivable wheels. For example, there may be two drivable wheels at the front of the body portion and one or more freely rotatable support wheels at the back. Preferably, all the support wheels are inflatable. More preferably, the body portion, wheel portions and inflatable support wheels are all connected to form the single inflatable enclosure.

Thus, in the inflated configuration, the wheels may support the body portion over the ground. When the wheels are driven to rotate, they cause movement of the vehicle over the ground.

Preferably, each of the wheel portions is connected to the body portion by a respective rigid axle element that protrudes from the body portion, whereby each wheel portion, when inflated, is rotatable about an axis defined by its respective axle element. The axle elements of a plurality of wheel portions may be connected to each other to provide a chassis for the vehicle. The chassis may be inside the body portion; each axle element therefore preferably penetrates the wall of the body portion. To prevent deflation, sealing gaskets are provided around each axle element when it exits the body portion.

Preferably, each axle element is a hollow tube (of any suitable cross-section) having a first outlet in the body portion and a second outlet in its respective wheel portion to provide fluid communication therebetween. The outlets may be radial, i.e. penetrate the tubular wall. In other words, the axle elements are also preferably joining elements that cause the body portion and wheel portion to form a single inflatable enclosure. Separate joining elements are also possible. When a inflation medium e.g. gas (preferably air) is pumped into any of the body portion or wheel portion(s), it is communicated, preferably by the tubular axle elements, to all other parts of the enclosure.

Preferably, the vehicle includes an inflation device arranged to pump gas into the enclosure. The inflation device may be mounted on the chassis. Preferably it is provided within the body portion e.g. out of sight of the user. The inflation device may operate continuously, e.g. to maintain a predetermined pressure in the enclosure. Preferably, the inflation device is a compressor e.g. powered by a battery that may also be mounted on the chassis. The compressor may be of a conventional type used for inflatable displays. The inflation pressure may be relatively low e.g. less than 0.5 bar, preferably less than 0.1 bar. This is consistent with conventional large scale inflatable displays. Preferably, e.g. to save on power consumption, the inflation device operates only when needed, e.g. periodically for a set time, or sporadically when required. The vehicle may include an internal pressure detector arranged to detect when the internal pressure falls below a threshold level e.g. to activate the inflation device.

In an alternative or additional arrangement for saving power, any or all of the inflatable body portion and wheel portion(s) may be independent volume sealed from one another to reduce leakage of the inflation medium. In a preferred arrangement, the body portion is a sealed inflated volume and the wheel portions are connected to each other to form the single inflatable enclosure. The inflation device may be provided on the chassis within the body portion but is preferably arranged to deliver the inflation medium to the wheel portions, e.g. via each axle element.

Preferably, each drivably rotatable wheel portion has a motor associated therewith. Each motor may include a traction drive unit which is connected to the wheel portion via a gear mechanism. Preferably, the motor is mounted on the axle element of the wheel portion such that the wheel is drivably rotatable with respect to its axle element.

Preferably, the motor is inside the wheel portion i.e. out of sight of the user. Thus, the axle element preferably penetrates the wall of the wheel portion. As above, a sealing gasket is preferably located between the wheel portion wall and axle element at the point of penetration to prevent deflation, e.g. gas leakage. Since there may be relative rotation between the wheel portion and axle element, a bearing is preferably incorporated into the wall of the wheel portion at the junction with the axle element.

To rotate the wheel portion, the motor is preferably connected to a torque transfer plate that is attached to the wall of the wheel portion.

Alternatively, the motor may be in the body portion (e.g. on the chassis) where it may be arranged to rotate the axle elements which in turn impart the drive rotational movement to their respective wheel portion.

The motor may be powered in any suitable way. It may be a petrol engine, or it may be powered by a battery. The vehicle may include a central (e.g. single) power source for powering the inflation device (if any) and motor or motors. The power source (preferably an engine or battery, e.g. lead acid or nickel cadmium) may be mounted inside the body portion. Cables may be provided e.g. carried through the tubular axle elements to transfer power from the power source to the motors.

As mentioned above, the number of drivable wheels is not critical to the present invention. In one embodiment ("two-wheel drive"), two driven wheels may be provided at opposite sides of the front of an elongate body position. A single support wheel (not driven) may be provided at the back, preferably behind, the body portion.

In the another embodiment ("four wheel drive"), four driven wheels are provided at opposite sides of the front and back of a body portion.

Preferably, the motors are independently controlled e.g. to enable the vehicle to be steered. For example, in the two-wheel device embodiment discussed above, the vehicle may turn right by driving only the left-hand wheel. The support wheel may be of the castor type, e.g. hinged to allow turning. Thus, the vehicle may include a control unit arranged to transform directional instructions from a user into drive commands for the motors. The control unit may be mounted on the chassis. The directional instructions may be provided directly to the control unit e.g. via a steering wheel or joystick if the user is carried by the vehicle. Alternatively or additionally, the vehicle may be controlled remotely e.g. via a radio signal transmitter. In this case, the control unit preferably includes a receiver for signals carrying the directional instructions. Conventional remote control technology may be used for the transmitter and receiver.

The invention may also provide a kit of parts comprising the body portion and wheel portions discussed above connectable to create any drivable inflatable vehicle discussed above.

BRIEF DESCRIPTION OF THE DRAWINGS

Examples of the invention are discussed in detail below with reference to the accompanying drawings, in which:

FIGS. 5B and 5C show a magnified portion of the chassis of FIG. 5A in closed and open configurations respectively;

DETAILED DESCRIPTION; FURTHER OPTIONS AND PREFERENCES

Figure 1:
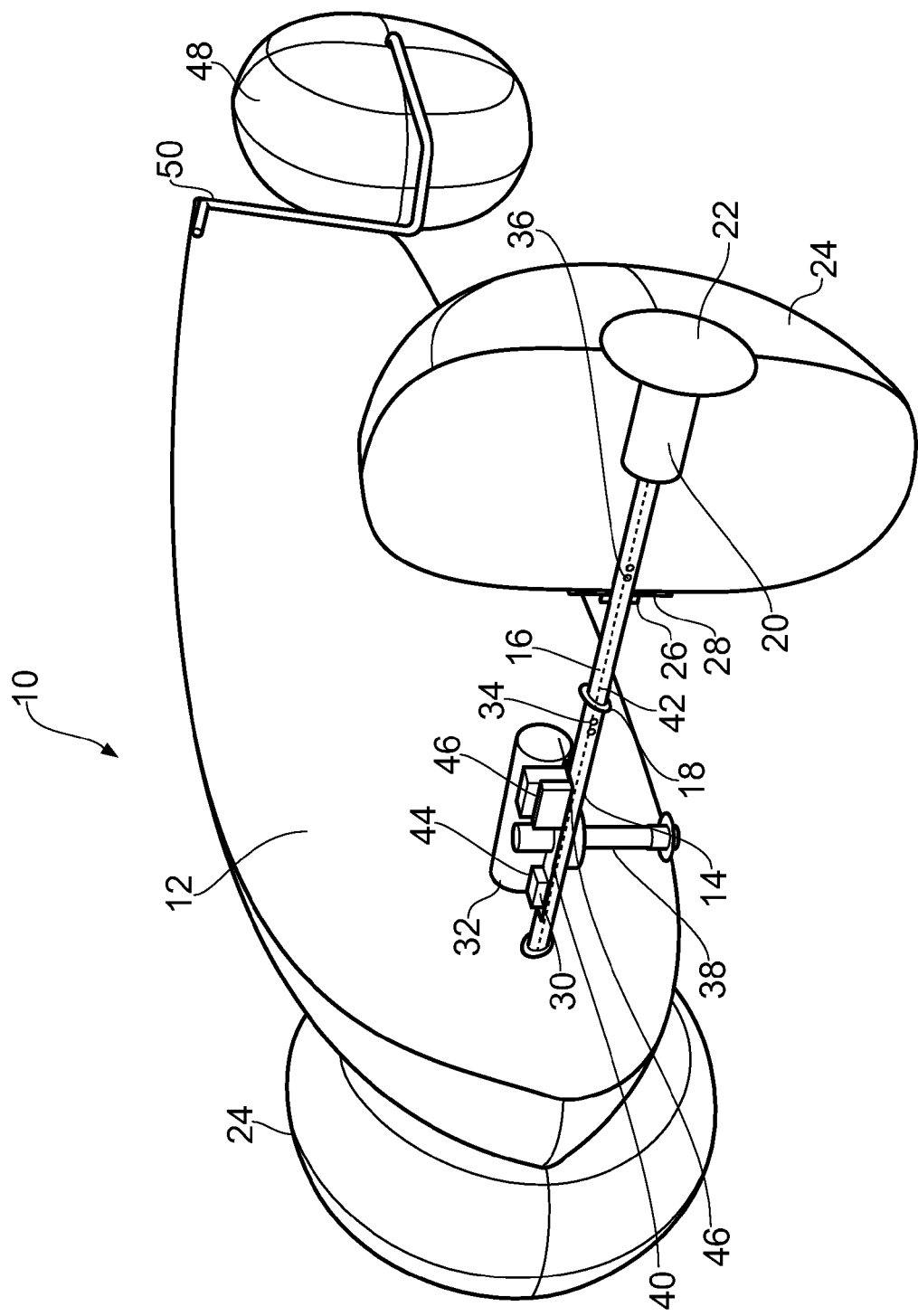
FIG. 1 illustrates a partially cut away perspective view of an inflatable vehicle that is a first embodiment of the invention.

FIG. 1 shows a three-wheeled inflatable car 10 that is a first embodiment of the present invention. The car is shown in its inflated state. The car 10 comprises a elongate body portion 12 and three quasi-cylindrical wheel portions 24, 48, all made from conventional inflatable material (e.g. woven nylon, PVC or polyurethane based materials). The weight (thickness) of the material is chosen depending on the function of the part of the vehicle. For example, the body portion can be made of relatively light material in order to reduce the load supported by the wheels, whereas the wheel portions may be of sturdier (heavier) material, especially where they are in contact with the ground. A tread of e.g. rubber may be provided around the wheels to improve grip. Towards the front of the body portion 12, a rigid axle 14 penetrates through the body portion 12 to provide two substantially horizontal protruding axle elements 16 on either side of the body portion 12. To prevent gas from escaping from the inflated body portion 12, sealing gaskets 18 are provided at the junction between the axle 14 and the wall of the body portion 12. Each end of the axle 14 is attached to a respective motor 20, which is fixed with respect to the axle 14 and arranged to drive (rotate) a torque transfer plate 22. Each of the torque transfer plates 22 is attached to a respective inflatable wheel portion 24 at the front of the vehicle. Each wheel portion 24 encloses its respective motor 20. To do this, it is necessary for each protruding axle element 16 to penetrate into its respective wheel portion 24. Again, a seal (gasket) 26 is provided at the junction between the wheel portion and the protruding axle element 16. Since the motor causes the wheel portion 24 to rotate relative to the protruding axle element 16, a bearing 28 is provided between the seal 26 and the wheel 24.

The body portion 12 is inflated through the action of an internal compression pump 30, which is mounted on the axle 14 and powered by a battery 32, which is also mounted on the axle 14. The compressor pump 30 works continuously to pressurise the interior of the body portion 12. The pressure is relatively low, e.g. 0.1 bar.

In a particularly advantageous feature of the present invention, the axle 14 is a hollow tube whose interior is accessible through inlets 34 within the body portion 12 and outlets 36 within the wheel portion 24. The inlets 34, outlets 36 and tubular axle 14 form a fluid communication path between the interior of the body portion 12 and the interior of each wheel portion 24 whereby the inflation gas produced by the compressor pump 30 in the body portion 12 is communicated to the wheel portion 24 to inflate it. In other words, the body portion 12 and the wheel portions 24 are all part of a single inflatable enclosure.

The compressor pump 30 draws air into the system through an inlet tube 38 that is attached between the axle 14 and the lower outer surface of the body portion 12.

A platform 40 is attached to the axle 14 within the body portion 12. Together, the platform 40 and axle 14 form a chassis for the inflatable car 10. The compressor 30 and battery 32 are mounted on the chassis. Cables 42 carry power from the battery 32 through the inside of tubular axle 14 to the motors 20.

The inlet tube 38 is attached to the body portion 12 substantially to prevent the chassis (i.e. the platform 40 and the axle 14) from spinning within (e.g. rotating with respect to) the body portion 12. Thus, the receiver 44 and control unit 46 may be held steady within the body portion and the chassis can be prevented from rotating when the motors 20 are driven. In the embodiment shown, the inlet tube 38 performs a dual function of drawing air into the compressor pump 30 and preventing spinning of the chassis. In an alternative arrangement, the chassis may be prevented from spinning within the body portion 12 by one or more support members (e.g. rigid rods) which need not act as inlets for the compressor pump 30.

Also mounted on the chassis is a radio signal receiver 44 adapted to receive control signals from a remote transmitter (not shown) to control the movement of the car 10. A control unit 46 is mounted on the chassis and arranged to convert the received radio signals into drive instructions for the motors 20.

To hold the body portion 12 above the ground, a support wheel 48 is provided at the rear of the body portion 12. An gas supply pipe 50 travels from inside of the body portion 12 through a seal (not shown) to the interior of the support wheel portion 48. The supply pipe 50 is hinged with respect to the body portion 12 to enable the support wheel 48 to turn rather than skid if the vehicle turns a corner.

Figure 2:
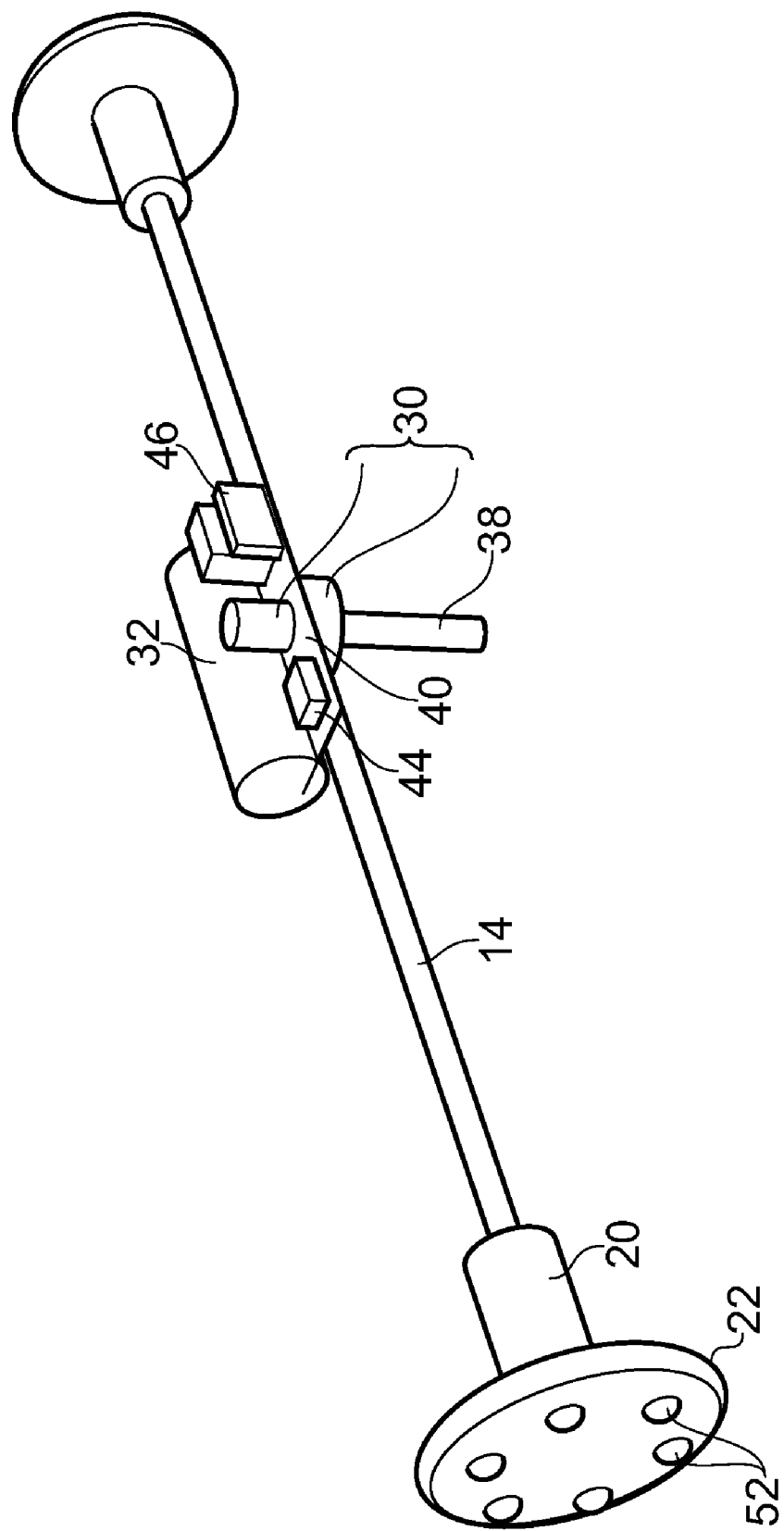
FIG. 2 shows the chassis of the vehicle of FIG. 1.

FIG. 2 illustrates the complete chassis construction of FIG. 1 in isolation from the body portion 12 and wheel portions 24. The components are given the same reference numbers as FIG. 1 and are not described again. FIG. 2 also shows the attachment bolts 52 used to attach the torque transfer plate 22 to the wheel portion 24.

Figure 3B:
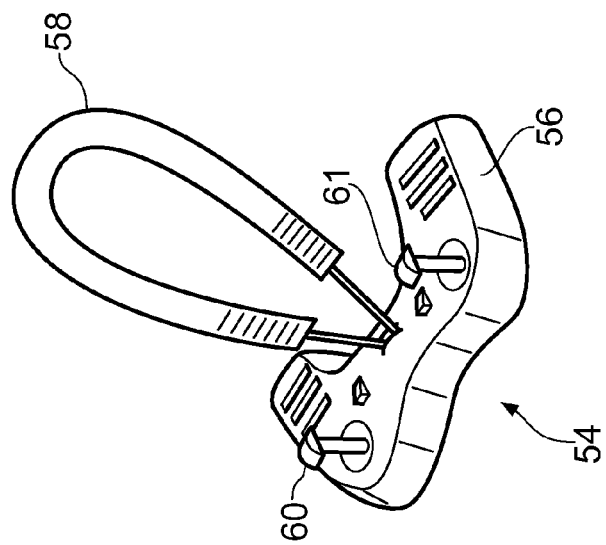
FIGS. 3A and 3B illustrate a remote control unit that may be used to control the vehicle of FIG. 1.
Figure 3A:
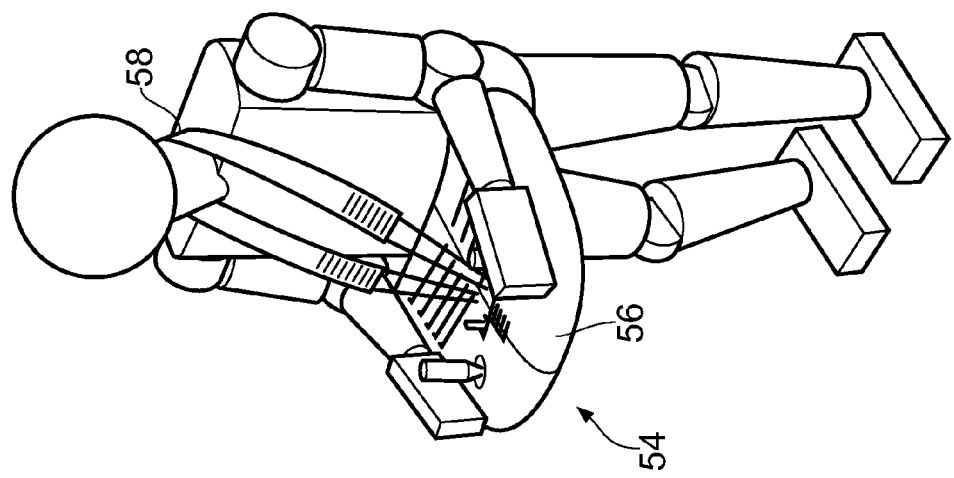
Figure 4B:
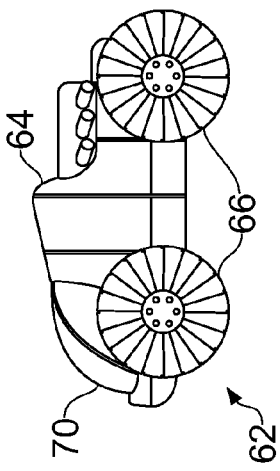
FIGS. 4A-4D show top, side, front and back views respectively of an inflatable vehicle that is a second embodiment of the invention.
Figure 4C:
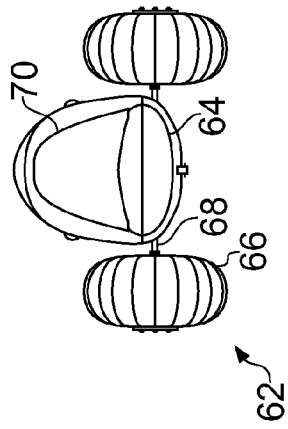
Figure 4D:
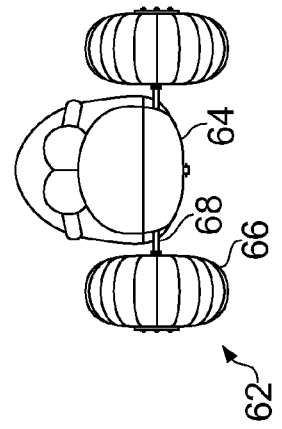
Figure 4A:
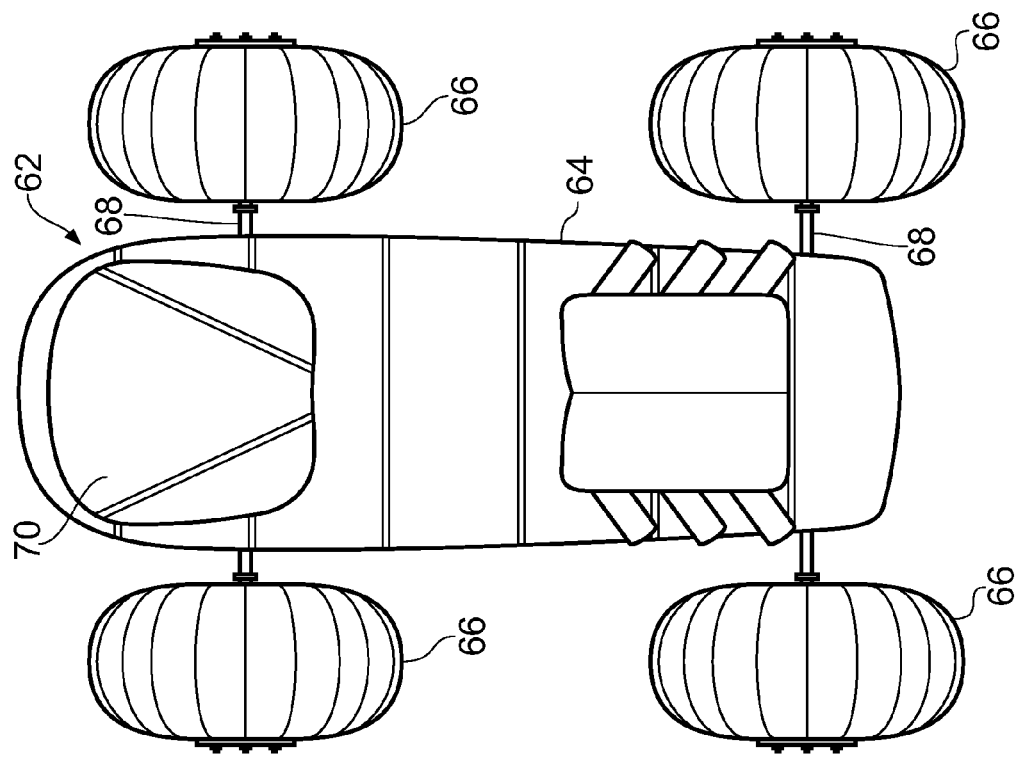

FIGS. 3a and 3b shows schematic representations of a remote control unit 54 that may be manipulated by the user to send control signals to the receiver 44 to control the movement of the car 10. The remote controller 54 includes a console 56 which can be supported on a user by a neck strap 58. The console 56 has two joysticks 60, 61 which can control movement of the car 10 in a conventional manner. For example, joystick 60 may be a forward/back controller and joystick 61 may be a left/right controller. Other types of control device, e.g. steering wheel, single joystick, push buttons etc. may also be used.

In the vehicle shown in FIG. 1, steering is achieved by rotating a wheel on one side of the body portion 12 faster than the wheel (or wheels) on the other side of the body portion. For example, if the left hand wheel is rotated faster than the right hand wheel, the car 10 will veer to the right. The control unit 46 is therefore arranged to interpret the signals received by the receiver 44 from the remote controller 54 to provide instructions as to the operation speeds of the motors associated with each wheel. Conventional mechanical steering arrangements are also possible; the necessary connections from the chassis to the wheel portions are sealed e.g. using the gaskets mentioned above where they pass through the wall of the body portion.

FIGS. 4a to 4d illustrate a four-wheeled embodiment of the present invention. Here the inflatable car 62 comprises a cigar-shaped body portion 64 with a pair of wheels 66 mounted on either side of the body portion 64 at each end thereof. Similar to the embodiment shown in FIG. 1, the wheels are inflated using a compressor mounted in the body portion 64, the interior of the body portion 64 being in communication with the interior of the wheels through tubular axle elements 68. In the embodiment shown in FIGS. 4a to 4d, a driver capsule 70 is formed at the front of the body portion 64.

Figure 5A:
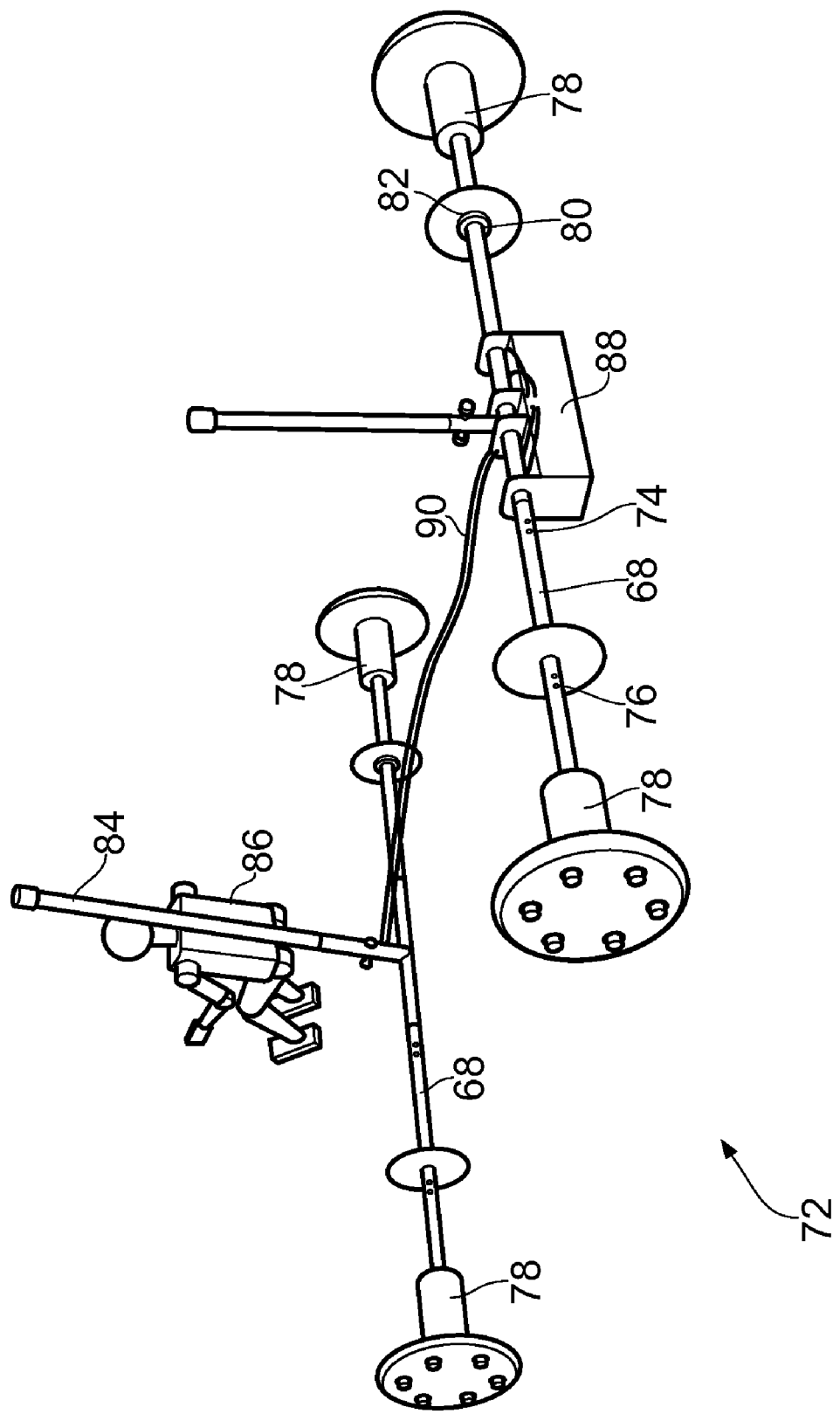
FIG. 5A shows the chassis of the vehicle of FIGS. 4A-4D.

FIG. 5a shows chassis 72 of the car 62. The chassis is formed of a pair of axles 68 for the front and rear wheels 66 respectively. As in the embodiment described in FIG. 1, each axle 68 is a hollow tube having an inlet 74 located inside the body portion 64 and an outlet 76 located inside each wheel portion 66. An independent motor 78 for each wheel 66 is attached at each end of each axle 68. FIG. 5a also shows the seal 80 and bearing 82 at the junction between the wall of the wheel portion and its axle 68. In FIG. 5a, the front axle 68 has a central rigid upstanding stem 84 to which a seat 86 in which a user sits is attached. This means that the user's weight is transferred to the chassis, in particular to the front pair of wheels.

The rear axle 68 shown in FIG. 5 has a container 88 mounted on it which contains the power supply (battery), compressor pump and control unit for the car. Power is transferred from the container via cables 90.

The container 88 is shown in more detail in FIGS. 5b and 5c. FIG. 5b shows that the axle 68 is received in a T-shaped connection adapter 92, which connects the horizontal axle to an upright stem 94. The stem 94 may include an aerial for receiving external radio signals e.g. to operate the car. The container 88 is a rectangular box 95 having four upright flanges 96 protruding from its upper surface. Each flange has a central hole 97 which receives the horizontal part of the T-shaped attachment connector 92, thereby securing the container 88 to the chassis. The box 95 has an openable cover 98 which is shown closed in FIG. 5a and open in FIG. 5c. The box contains a pair of batteries 100 for providing power to the wheel motors on the basis of instructions from a control unit (not shown).

Figure 6:
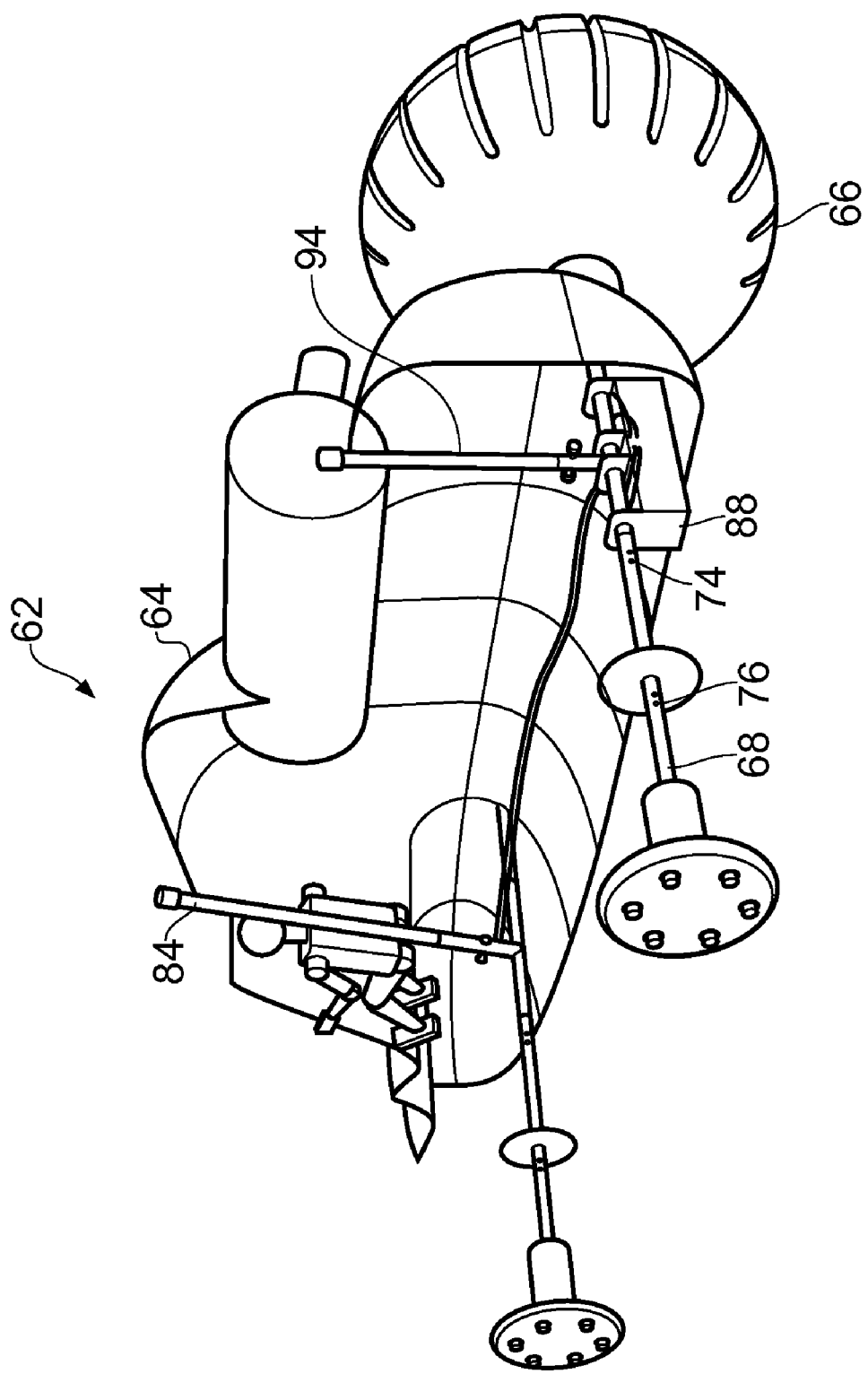
FIG. 6 shows a partially cut away back perspective view of the vehicle of FIGS. 4A-4D.

FIG. 6 shows a cutaway view of the chassis shown in FIG. 5a applied to the car 62 of FIGS. 4a to 4d. Here it can be seen that the upright stems 84, 94 protrude out of the body portion 64. Seals (not shown) are provided at the junction between the upright stems 84, 94 and the body portion in 64 to prevent leakage and consequent deflation. By providing the upright stems 84, 94, the chassis has additional structural stability within the car because it prevents each axle 68 from rotating relative to the body portion 64.

Figure 7:
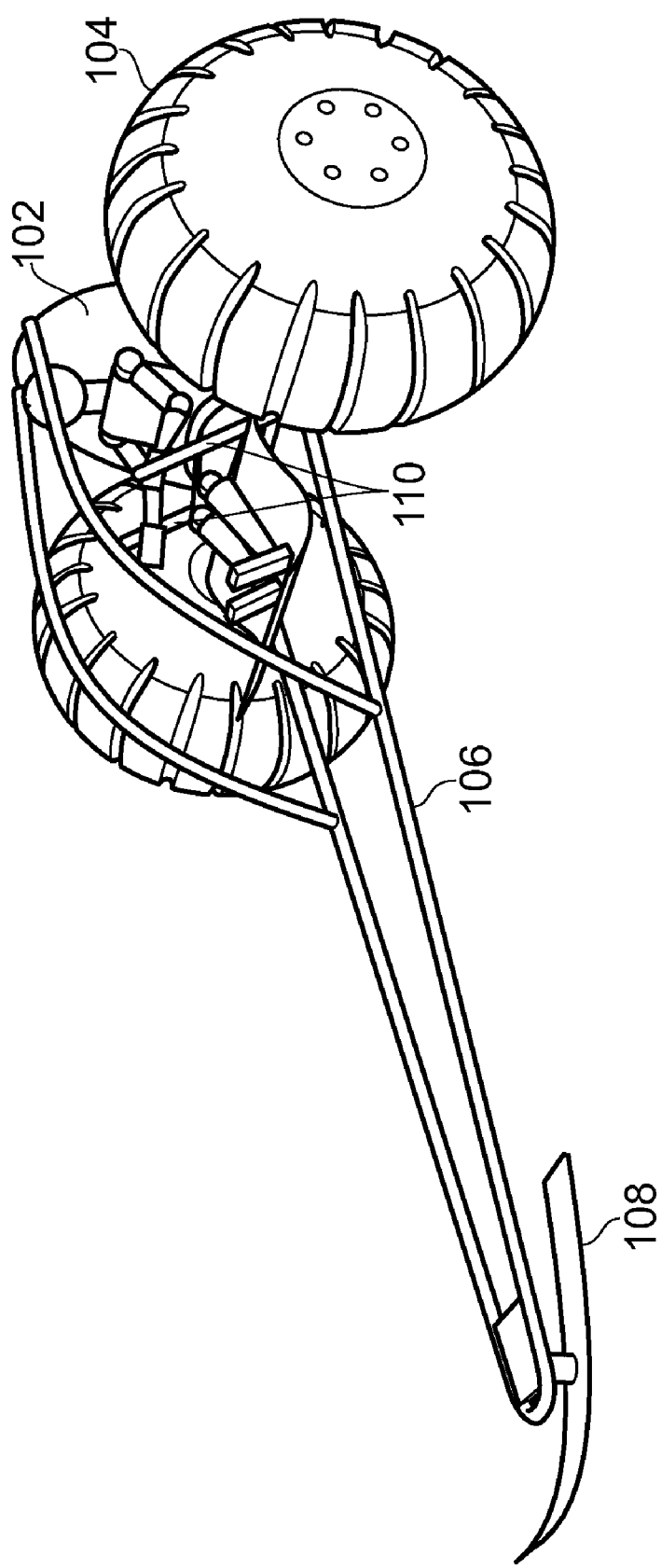
FIG. 7 shows a perspective view of a third embodiment of the invention.

FIG. 7 shows a two-wheel inflatable vehicle that is a third embodiment of the present invention. In this embodiment, the body portion 102 is smaller than the wheels 104. Nevertheless, it operates under the same principles as described above in that an axle travels through the body portion 102, which axle acts as a chassis for the vehicle as well as a conduit for the inflation medium (air) produced in the body portion 102. In the third embodiment, a frame 106 is attached to the axle and body portion 102 and extends out in front of the wheels before terminating at a support ski 108 which is steerable by the user using levers 110. The motors may be remote controlled or controlled e.g. using a pedal (not shown).

Figure 8:
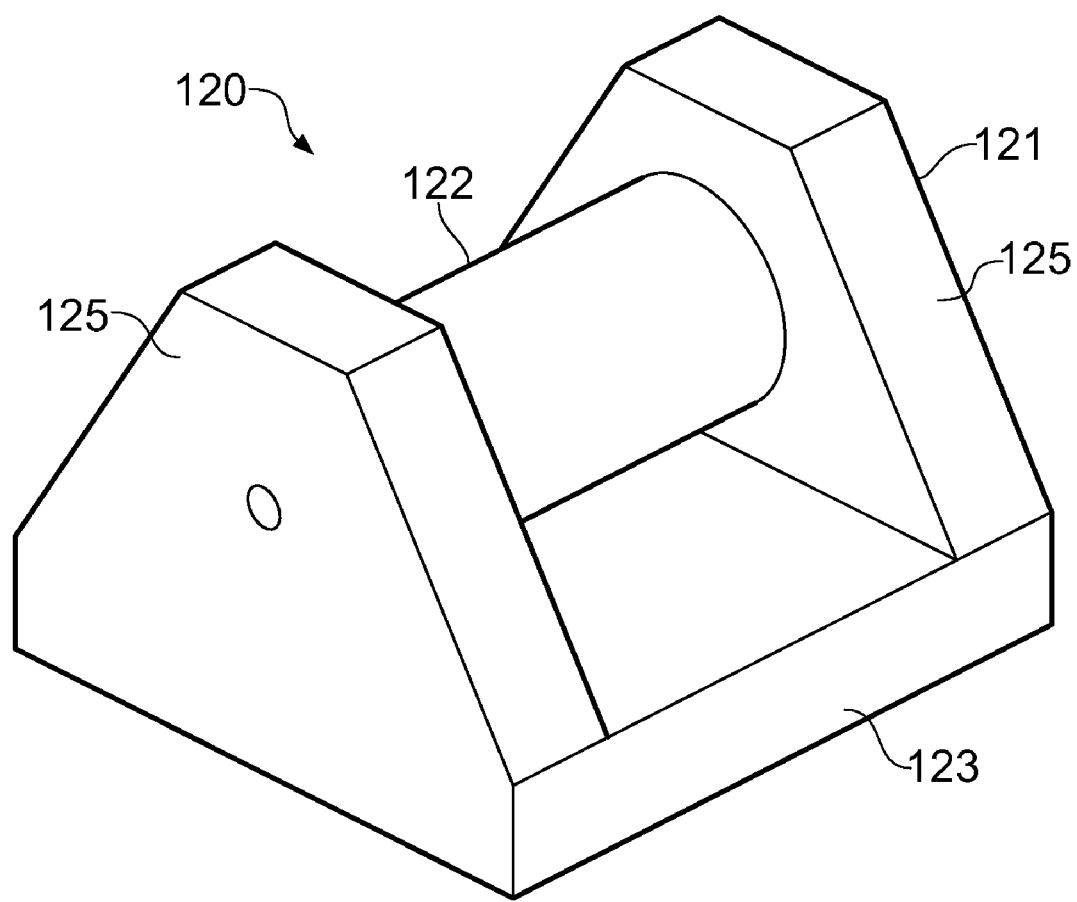
FIG. 8 shows a perspective view of inflatable recreation apparatus that is a further embodiment of the invention.

In another aspect, the present invention may be used in inflatable recreational apparatus, e.g. "bouncy castles" or the like. FIG. 8 shows a perspective view of an example of such recreation apparatus, which is an embodiment of the invention.

FIG. 8 shows an inflated recreation apparatus 120 which comprises a body portion 121 which has an inflatable floor 123 for resting on the ground and two upstanding inflatable walls 125. In the embodiment shown, the enclosures that define the walls 125 and floor 123 are in fluid communication with one another so that the entire body portion can be inflated from a single source. As an alternative, the floor 123 could be inflated separately from the walls 125, and the walls 125 could even be inflated separately. This may enable the pressure within the enclosures to be maintained more efficiently.

A inflatable rotary portion 122 in the shape of a barrel is located between the upstanding walls 125. The enclosure defining the rotary portion 122 (shown inflated in FIG. 8) is in fluid communication with one or both of the enclosures defined the walls 125 as described with respect to FIGS. 9 and 10.

Figure 9:
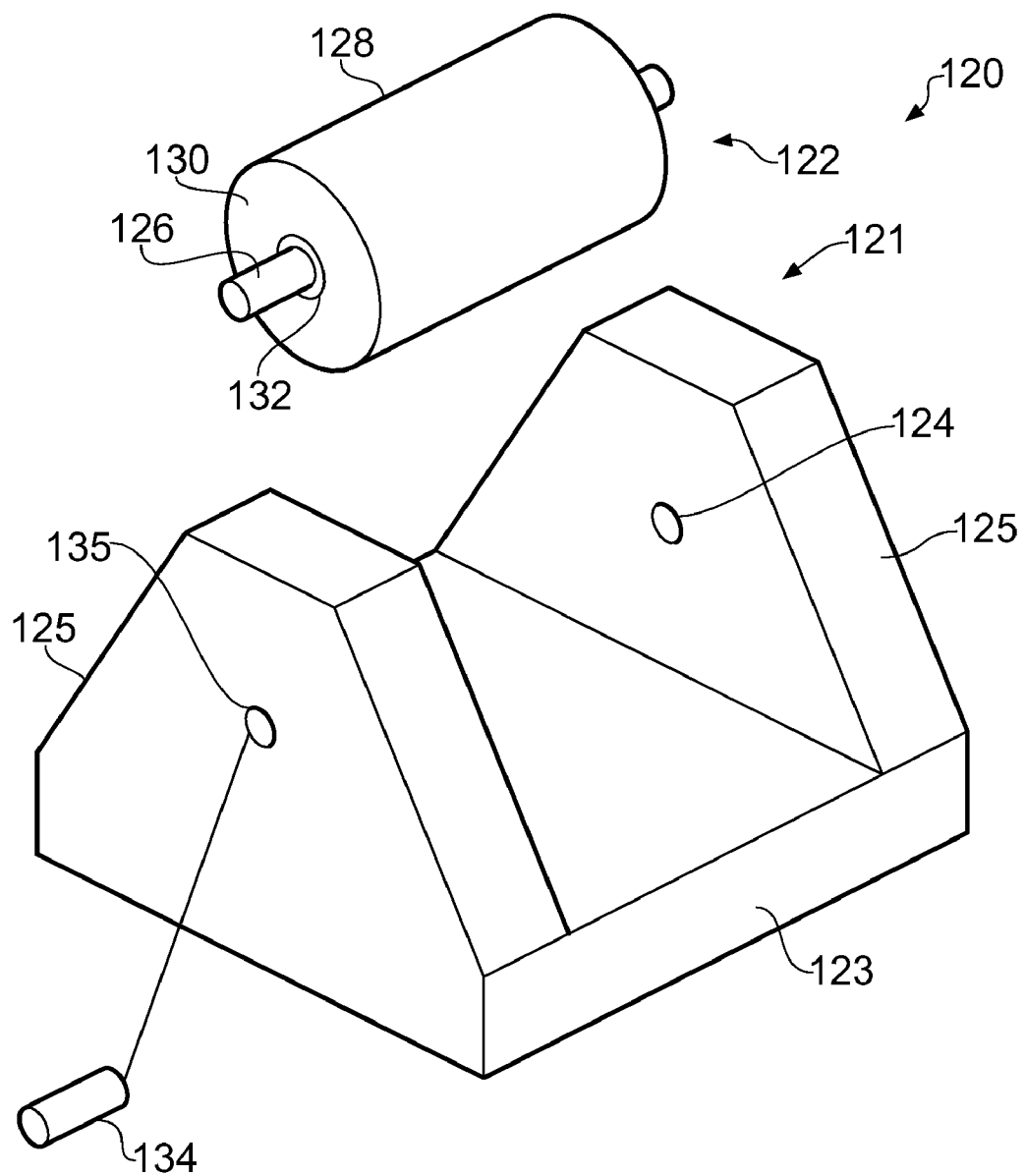
FIG. 9 shows a perspective view of the apparatus of FIG. 8 with its body and rotary portions in a separated configuration.

FIG. 9 shows the inflated recreation apparatus 120 with the body portion 121 and rotary portion 122 separated from one another. To rotate freely relative to the body portion 121, the rotary portion 122 is a physically separate entity. The rotary portion 122 is rotatably mounted on a rigid hollow axle 126 whose ends are receivable in ports 124 formed in each wall 125. The ports 124 have a seal (not shown) around the opening so that substantially none of the inflating medium (e.g. air) escapes past the outside edge of the axle 126 when it is received in the port 124. However, the inflating medium does pass into the axle 126 itself.

Figure 10:
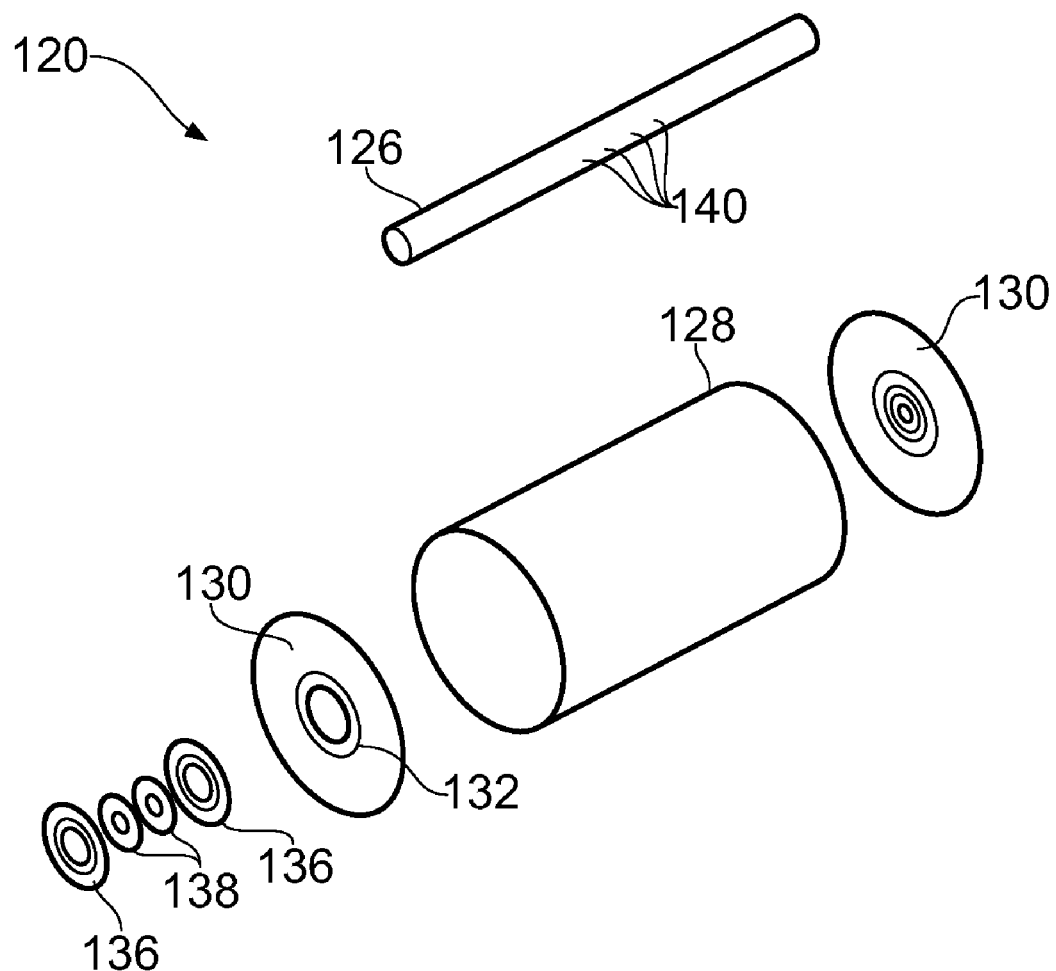
FIG. 10 shows an exploded perspective view of the rotary portion shown in FIG. 9.

The "barrel" part of the rotary portion 122 is formed around the axle and is shown in detail in FIG. 10. It comprises a cylindrical body 128 attached to closure discs 130 at each end. The closure discs 130 have a central hole 132 for receiving the axle 126 therethrough. Each hole 132 has a robust seal 136,138 associated with it to prevent substantial leakage of the inflating medium out of the "barrel" whilst permitting it to rotate on the axle.

As shown in FIG. 10 this is achieved by providing a pair of washers 138 which fit in a sealing manner around the axle 126. The washers 138 are tightly constrained within a chamber defined by a pair of rings 136, which are attached to the hole 132 though each closure disc 130. The rings 136 are rotatable relative to the washers 138, but due to the tightly space constraint, little or no leakage from the "barrel" occurs.

The "barrel" part is in fluid communication with the inside of the axle 126 through a plurality of axial holes 140 formed in the axle wall. Thus, the rotary portion 122 effectively forms a single inflatable enclosure with the body portion 121 through the axle 126.

FIG. 9 shows an inlet 135 formed on the outside of one of the upstanding walls 125. The inlet 135 is arranged to receive a input pipe 134 for providing inflating medium to the apparatus 120. The apparatus 120 may therefore operate in a inflation mode, where inflating medium is provided to the enclosure during use e.g. to adjust for changes in pressure. Alternatively, the inlet 135 may be sealed, i.e. inflation may occur before use.

The invention claimed is:

1. A vehicle having an inflatable body portion in fluid communication with one or more inflatable wheel portions to form a single inflatable enclosure, the body portion being supportable by the wheel portions when the enclosure is inflated, wherein one or more of the wheel portions are drivably rotatable with respect to the body portion.

2. A vehicle according to claim 1, wherein each of the wheel portions is connected to the body portion by a respective axle element that protrudes out of the body portion, wherein each wheel portion, when inflated, is rotatable about an axis defined by its respective axle element.

3. A vehicle according to claim 2, wherein each axle element includes a tube having a first outlet in the body portion and a second outlet in its respective wheel portion to provide fluid communication therebetween.

4. A vehicle according to claim 1 including an inflation device arranged to pump gas into the enclosure.

5. A vehicle according to claim 1, wherein each drivably rotatable wheel portion has a motor associated therewith.

6. A vehicle according to claim 5, wherein each motor is arranged to cause its wheel portion to rotate relative to an axle element which connects the wheel portion to the body portion.

7. A vehicle according to claim 6, wherein each motor is independently controllable.

8. A vehicle according to claim 1, wherein the body portion includes a seat for a driver, the driver and body portion being supportable by the wheel portions when the enclosure is inflated.

\* \* \* \* \*